United States Patent Office 3,378,533
Patented Apr. 16, 1968

3,378,533
PROCESS FOR THE PRODUCTION OF STABLE PREPOLYMERIZATES AND SHAPED ARTICLES THEREOF
Hermann Schnell, Krefeld-Urdingen, Helmut Mylenbusch, Gummersbach-Karlskamp, and Heinrich Krimm, Krefeld-Bockum, Germany, assignors to Farbenfabriken Bayer Aktiengesellschaft, Leverkusen, Germany, a German corporation
No Drawing. Filed Mar. 31, 1964, Ser. No. 356,056
Claims priority, application Germany, Apr. 3, 1963, F 39,397
7 Claims. (Cl. 260—78.5)

The present invention is concerned with a process for the production of stable prepolymerizates and shaped articles thereof.

It is known that polymerizations of suitable compounds, initiated by radical-producing catalysts, can be interrupted by certain measures. To these belong, for example, the introduction of materials into the reaction mixture which act as radical interceptors and thus prevent any further polymerization. Such materials are, for example, hydroquinone, quinhydrone, phenols, nitroso compounds, sulphur and oxygen, as well as solvents and chain breakers. However, such a procedure has the disadvantage that the materials introduced for interrupting the polymerization continue to act as inhibitors when the polymerization is later to be continued. Thus, the interruption of the polymerization is irreversible and amounts to a stoppage of the polymerization which can possibly only be overcome to some extent by removing the inhibitors, such as solvents, or by addition of further amounts of catalysts. If, on the other hand, an attempt is made to interrupt the polymerization initiated by hydroperoxides, diacyl peroxides, per acid esters, dialkyl peroxides or suitable azo compounds by cooling alone, without the addition of inhibitors, then the pre-polymerizates are only storable to a limited extent, since the polymerization is only more or less slowed down, even at low temperatures, but not really stopped.

However, reversibly stable prepolymerizates of compounds which contain polymerizable double bonds are of great interest for a number of applications. The increased viscosity in comparison with the monomers and the reduced shrinkage upon curing enable them to be used, for example, as casting, moulding and laminating resins.

The production of such prepolymerizates, which are always mixtures of various high polymers and monomers, is the more difficult, the higher their proportion of polymers, since, as is known, the polymerization velocity increases with the viscosity of the material. The production of stable pre-polymerizates of monomers or monomeric mixtures with more than one polymerizable double bond in the molecule is especially difficult. Non-cross-linked prepolymerizates can, in this case, only be produced from comparatively inert compounds. However, it is precisely the reactive systems which can be cured in a short time under the mildest possible conditions which are of especial technical interest. However, upon polymerization, these lead very quickly to cross-linked polymerizates and the homogeneous incorporation into such a prepolymerizate of the polymerization catalyst, which is, as a rule, necessary for further curing, is no longer possible in a satisfactory manner.

Surprisingly, we have found that polymerization reaction mixtures can be interrupted reversibly stable at any desired degree of polymerization, merely by cooling, when, as radical-producing catalysts, there are used compounds of the general formula:

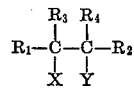

wherein $R_1$ and $R_2$, which may be the same or different, are unsubstituted or substituted aromatic radicals, $R_3$ is a hydrogen atom or an unsubstituted or substituted aliphatic or aromatic radical, $R_4$ signifies an unsubstituted or substituted aliphatic or aromatic radical and X and Y, which may be the same or different, signify substituted or unsubstituted hydroxyl groups and/or substituted or unsubstituted amino groups and/or halogen atoms and/or the nitrile group.

The prepolymerizates can be produced in any desired viscosity, not only as non-cross-linked but also as slightly cross-linked prepolymerizates of syrupy consistency, as well as in the form of gel-like and dry, crumbly products.

The outstanding feature of the present invention is that the prepolymerizates produced with the previously mentioned catalysts are absolutely stable at room temperature so that their viscosity does not change, even in the course of several months, but that, nevertheless, they can be completely cured at any time by simple heating. The end products thus produced in two or more stages do not differ in their mechanical properties from those which have been produced in one stage.

Thus, the object of the present invention is a process for the production of reversibly stable prepolymerizates of any desired viscosity from monomers or monomeric mixtures which contain one or more polymerizable double bonds and the production of shaped articles by curing these prepolymerizates, while mounding, said process being characterized in that compounds of the above-given general formula are used as polymerization-initiating catalysts, the starting mixtures heated at polymerization temperatures until the desired degree of polymerization is reached, cooled to room temperature, and the so obtained prepolymerizates optionally cured later at any desired time in at least one further stage by heating and cooling, possibly several times.

Catalysts in the meaning of the invention are all substituted ethanes which have in each of the 1- and 2-positions a hydroxyl group, possibly blocked by etherification or esterification, and/or a possibly substituted amino group and/or a halogen atom, which also possess on both ethane carbon atoms at least one unsubstituted or substituted aromatic radical and in which at least one of the remaining valencies is satisfied by an unsubstituted or substituted aromatic or aliphatic radical. If the radicals $R_1$, $R_2$, $R_3$ and $R_4$ are exclusively of an aromatic nature, then the catalysts display their polymerization-initiating action at comparatively low temperatures. On the other hand, the partial incorporation of aliphatic radicals leads to an increase of the initiation temperature, as does also presence of a hydrogen atom. Preferred compounds are those in which $R_1$ is the same as $R_2$, $R_3$ is the same as $R_4$ and X and Y are both hydroxyl groups. These compounds, known as pinacones, are especially easily obtainable by reduction of the corresponding ketones.

The most typical representative of these ethane derivatives is benzpinacone. As further representatives of this class of compounds there may be mentioned, for example, 4,4' - dichlorobenzpinacone, 4,4' - dibromobenzpinacone, 4,4' - diiodobenzpinacone, 4,4',3",4'" - tetrachlorobenzpinacone, 2,4,2',4' - tetrachlorobenzpinacone, (as)-4,4'' - dichlorobenzpinacone, (as)-4,4''' - difluorobenzpinacone, 4,4' - dimethyl-benzpinacone, 3,3' - dimethylbenzpinacone, 2,2' - dimethyl - benzpinacone, 3,4,3',4' - tetramethyl-benzpinacone, 4,4' - dimethoxy-benzpinacone, 2,4,2',4' - tetramethoxy-benzpinacone, 4,4'-diphenyl-benzpinacone, 4,4' - dichloro - 4'',4''' - dimethyl-benzpinacone, 4,4' - dimethyl - 4'',4''' diphenyl-benzpinacone, 4,4' - di - (methylmercapto)-benzpinacone, 4,4',4'',4''' - tetra-(dimethylamino)-benzpinacone, 1,2-di-(3 - pyridyl) - 1,2 - diphenyl-glycol, xanthone-pinacone, fluorenonepinacone, acetophenone-pinacone, 4,4' - dimethyl-acetophenone-pinacone, 4,4' - dichloro-acetophenone-pinacone, 1,1,2 - triphenylpropane - 1,2-diol, 1,2,3,4-tetraphenyl-butane - 2,3-diol, 1,2 - diphenyl-cyclobutane-1,2-diol, propiophenone-pinacone, 4,4' - dimethyl-propiophenone-pinacone, 2,2' - ethyl - 3,3' - dimethoxy-propiophenone-pinacone and 1,1,1,4,4,4 - hexafluoro - 2,3-diphenylbutane-2,3-diol.

Further compounds which can be used according to the process of the present invention are, for example, benzpinacone monomethyl ether, benzpinacone dimethyl ether (produceable from 1,2 - dichlortetraphenylethane and sodium methylate), benzpinacone monoethyl ether, benzpinacone diethyl ether, benzpinacone monophenyl ether, benzpinacone diphenyl ether, tetraphenyl succinic acid dinitrile, tetraphenyl-succinic acid dimethyl ester, tetraphenyl-succinic acid diethyl ester, the cyclic carbonate of benzpinacone, the cyclic sulphite of acetophenone-pinacone, benzpinacone dibenzoate, 1,2 - dichlorotetra-phenylethane, triphenyl-glycol, 1,2,3 - triphenylpropane-1,2-diol and triphenyl ethanolamine.

The catalysts are, in general, used in amounts of about 0.1 to about 10%, referred to the polymerizable monomers. If desired, it is also possible to use these catalysts in admixture with other radical-producing catalysts.

For the production of prepolymerizates with the aid of the new catalysts, suitable monomers are practically all compounds which contain one or more polymerizable double bonds in the molecule, for example, styrene, vinyl-toluene, acrylonitrile, methacrylonitrile, acrylic ester, methacrylic ester, vinyl chloride, vinylidene chloride, butadiene, isoprene, chloroprene, divinyl-benzene, di-(vinyl-phenyl) carbonate, diallyl phthalate diallyl carbonate, di-(allyl-phenyl) carbonate, poliol-polyacrylate and -polymethacrylate, N,N' - methylene-bis-acrylamide and -methacrylamide and diallyl fumarate.

The following examples are given for the purpose of illustrating the present invention:

Example 1

A number of monomers are mixed with various catalysts to be used according to the present invention and polymerized at a temperature of 80° C. up to a viscosity of about 3000 cp. The test samples are then cooled to room temperature, stored at room temperature in closed vessels and their viscosities are measured at regular intervals.

Comparative experiments are carrier out with dibenzoyl peroxide, methyl ethyl ketone, hydroperoxide and azo-diisobutyric acid nitrile.

The results are set out in Table 1.

Example 2

A number of monomers are copolymerized together with various monomers which contain more than one polymerizable double bond in the molecule and the course of the viscosity is checked as in Example 1.

The results are set out in Table 2.

Example 3

A mixture of 80 g. styrene and 20 g. diallyl phthalate is mixed with 2 g. tetraphenyl-ethylene glycol and polymerized in a stirring apparatus at 120° C. until a cross-linked, gel-like polymerizate is formed. This is then cooled to room temperature and the prepolymerizate stored in a closed vessel at room temperature. After 12 weeks, the consistency of the prepolymerizate is unchanged. Under the same conditions, a prepolymerizate produced with dibenzoyl peroxide as catalyst is further polymerized after 2 weeks to a hard, crumbly mass.

Example 4

A mixture of 80 g. methacrylic acid methyl ester and 20 g. ethylene glycol-dimethylacrylic acid ester is mixed with 2 g. tetraphenyl-1,2-dichloroethane and polymerized in a stirring apparatus at reflux temperature until a cross-linked gel-like product is formed. This is then cooled to room temperature and the prepolymerizate is stored in a closed vessel at room temperature. After 12 weeks, the consistency of the prepolymerizate is unchanged. Under the same conditions, a prepolymerizate produced with azodiisobutyric acid nitrile as catalyst is further polymerized after 4 days to a solid mass.

Example 5

A mixture of 60 g. styrene, 25 g. acrylonitrile and 15 g. di-(isopropenylphenyl) carbonate is mixed with 2 g. tetraphenylethylene glycol diethyl ether and polymerized in a stirring apparatus at 85° C. until a cross-linked, gel-like product is formed. This is then cooled to room temperature and the prepolymerizate stored in a closed vessel at room temperature. After 12 weeks, the consistency of the prepolymerizate is unchanged. Under the same conditions, a prepolymerizate produced with cumol hydroperoxide as catalyst is further polymerized after 10 days to a hard mass.

Example 6

A mixture of 60 g. styrene, 30 g. acrylonitrile and 10 g. divinyl-benzene is mixed with 2 g. 1,1,2-triphenyl-2-methyl-ethylene glycol and polymerized in a stirring apparatus at 85° C. until a cross-linked, gel-like product is formed. This is then cooled to room temperature and the prepolymerizate stored in a closed vessel at room temperature. After 12 weeks, the consistency of the prepolymerizate is unchanged. Under the same conditions, a prepolymerizate produced with methyl ethyl ketone hydroperoxide as catalyst is further polymerized after 5 days to a hard, crumbly mass.

Example 7

A mixture of 60 g. styrene, 30 g. acrylic acid ethyl ester and 10 g. diallyl fumarate is mixed with 2 g. tetraphenyl-ethylene glycol and polymerized in a stirring apparatus at 85° C. until a cross-linked, gel-like product is formed. This is then cooled to room temperature and the prepolymerizate stored in a closed vessel at room temperature. After 12 weeks, the consistency of the polymerizate is unchanged. Under the same conditions, a pre-polymerizate produced with tert.-butyl peracetate as catalyst is further polymerized after 13 days to a hard mass.

Example 8

A mixture of 80 g. methyl acrylate and 20 g. triallyl phosphate is mixed with 2 g. tetraphenylethylene glycol dimethyl ether and polymerized at reflux temperature in a stirring apparatus until a cross-linked, gel-like product is formed. This is then cooled to room temperature and the prepolymerizate stored in a closed vessel at room temperature. After 12 weeks, the consistency of the prepolymerizate is unchanged. Under the same conditions, a prepolymerizate produced with di-tert.-butyl peroxide as catalyst is further polymerized after 9 days to a hard mass.

Example 9

100 g. of each of the prepolymerizates set out in Example 2 under numbers 2, 3 and 4 are poured into a plate mould of 4 mm. depth and 150 x 200 mm. area and heated for 30 minutes at 80° C. The prepolymerizates harden to solid plates, the mechanical properties of which do not differ from those which have been produced in one stage.

Example 10

A glass mat of 150 x 200 mm. size is impregated with 100 g. of the prepolymerizate produced according to Example 5. This strengthened plate is cured in a closed mould at 110° C. within a period of 10 minutes.

TABLE 1

| No. | Monomer | Catalyst | Viscosity in cp. after weeks— | | | | | |
|---|---|---|---|---|---|---|---|---|
| | | | 0 | 1 | 2 | 4 | 8 | 12 |
| 1 | Styrene | Tetrapenylethylene glycol | 4,028 | 4,025 | 4,026 | 4,030 | 4,029 | 4,030 |
| 1a | do | Dibenzoyl peroxide | 6,280 | 18,905 | (¹) | (¹) | (¹) | (¹) |
| 2 | Acrylic acid ethyl ester | Tetraphenylethylene glycol dimethyl ether | 5,485 | 5,488 | 5,486 | 5,488 | 5,487 | 5,488 |
| 2a | do | Methyl ethyl ketone hydroperoxide | 3,126 | 20,300 | (¹) | (¹) | (¹) | (¹) |
| 3 | Methyl methacrylate | Tetraphenylethylene glycol | 4,983 | 4,982 | 4,984 | 4,982 | 4,982 | 4,983 |
| 3a | do | Azodiisobutyric acid nitrile | 2,827 | (¹) | (¹) | (¹) | (¹) | (¹) |
| 4 | Acrylonitrile (20% in DMF ²) | 1,1,2,2-tetraphenyl-1,2-dichloroethane | 829 | 827 | 831 | 830 | 829 | 830 |
| 4a | do | Cumol hydroperoxide | 1,036 | 2,394 | 8,728 | (³) | (³) | (³) |
| 5 | Styrene/acrylonitrile 70/30 | Tetraphenylethylene glycol | 7,230 | 7,235 | 7,236 | 7,234 | 7,234 | 7,235 |
| 5a | do | Dibenzoyl peroxide | 6,498 | (¹) | (¹) | (¹) | (¹) | (¹) |

¹ Solid.
² Dimethyl formamide.
³ No longer measurable.

TABLE 2

| No. | Monomer | Cross-linker | Catalyst | Viscosity in cp. after weeks— | | | | |
|---|---|---|---|---|---|---|---|---|
| | | | | 0 | 1 | 4 | 8 | 12 |
| 1 | Styrene | Divinyl benzene | Tetraphenyl succinic acid dinitrile | 5,216 | 5,219 | 5,219 | 5,218 | 5,220 |
| 1a | do | do | Cumol hydroperoxide | 7,320 | (¹) | (¹) | | |
| 2 | Acrylic acid ethyl ester | Glycol dimethacrylate | Tetraphenylethylene glycol | 3,716 | 3,725 | 3,728 | 3,731 | 3,738 |
| 2a | do | do | Azodiisobutyric acid nitrile | 4,826 | (¹) | | | |
| 3 | Methacrylic acid methyl ester | Di-(isopropenylphenyl) carbonate | Tetraphenylethylene glycol dimethyl ether | 3,775 | 3,774 | 3,776 | 3,778 | 3,776 |
| 3a | do | do | Azodiisobutyric acid nitrile | 6,481 | (¹) | | | |
| 4 | Styrene/acrylonitrile 70/30 | do | Tetraphenylethylene glycol | 4,823 | 4,825 | 4,824 | 4,826 | 4,826 |
| 4a | do | do | Dibenzoyl peroxide | 5,197 | (¹) | | | |

¹ Crosslinked.

We claim:

1. Process for the stepwise production of polymerizates from monomers selected from the group consisting of styrene, divinyl benzene, acrylic esters, acrylic amides, acrylic nitriles, methacrylic esters, methacrylic amides, methacrylic nitriles, 1,3-dienes and allyl esters comprising heating, at polymerization temperature, a mixture of said monomer and a polymerization catalyst of the general formula:

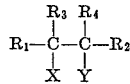

wherein $R_1$ and $R_2$ are substituents selected from the group consisting of unsubstituted and substituted aromatic radicals, $R_3$ is a substituent selected from the group consisting of hydrogen, unsubstituted and substituted aliphatic radicals and unsubstituted and substituted aromatic radicals, $R_4$ is a substituent selected from the group consisting of unsubstituted and substituted aliphatic radicals and unsubstituted and substituted aromatic radicals, and X and Y are substituents selected from the group consisting of free and blocked hydroxy groups, unsubstituted and substituted amino groups, halogen atoms and the nitrile group, the mixture consisting of said monomers and said catalysts being heated until the desired degree of prepolymerization is reached prior to the time the catalyst is deactivated, cooling the prepolymerizate to stop polymerization and thereafter heating the said prepolymerizate with no additional initiator having been added to complete the polymerization.

2. Process according to claim 1, wherein the catalysts are used in amounts of about 0.1 to about 10 percent by weight, referred to the monomers employed.

3. Process according to claim 1, wherein the catalysts are used in admixture with other polymerization-initiating catalysts.

4. Process according to claim 1, wherein there is used a mixture of monomers having one polymerizable double bond in the molecule with monomers which contain more than one polymerizable double bond in the molecule.

5. Process according to claim 1, wherein the catalyst used is one in which $R_1$ is the same as $R_2$, $R_3$ is the same as $R_4$ and X and Y are both hydroxyl groups.

6. Prepolymerizates comprising a mixture of partially polymerized monomers selected from the group consisting of styrene, divinyl benzene, acrylic esters, acrylic amides, acrylic nitriles, methacrylic esters, methacrylic amides, methacrylic nitriles, 1,3-dienes and allyl esters and a polymerization catalyst of the general formula:

$$R_1-\underset{\underset{X}{|}}{\overset{\overset{R_3}{|}}{C}}-\underset{\underset{Y}{|}}{\overset{\overset{R_4}{|}}{C}}-R_2$$

wherein $R_1$ and $R_2$ are substituents selected from the group consisting of unsubstituted and substituted aromatic radicals, $R_3$ is a substituent selected from the group consisting of hydrogen, unsubstituted and substituted aliphatic radicals and unsubstituted and substituted aromatic radicals, $R_4$ is a substituent selected from the group consisting of unsubstituted and substituted aliphatic radicals and unsubstituted and substituted aromatic radicals, and X and Y are substituents selected from the group consisting of free and blocked hydroxy groups, unsubstituted and substituted amino groups, halogen atoms and the nitrile group, said catalyst being deactivated by cooling and said prepolymerizate showing no change in viscosity due to the catalyst being deactivated, said prepolymerizate being capable of heating to polymerization temperature to complete the polymerization without the addition of an initiator.

7. Process for the production of shaped articles which comprises curing the prepolymerizates according to claim 6 by heating them to polymerization temperatures with no additional initiator having been added while molding and cooling the articles.

References Cited

UNITED STATES PATENTS 3,066,115 11/1962 Smith et al. ......... 260—78.5
3,153,022 10/1964 Calkins et al. ...... 260—80.81
3,278,502 10/1966 Huyser et al. ......... 260—80

OTHER REFERENCES

Cram et al., J. Am. Chem. Soc., 81, 5760–7 (1959).

JOSEPH L. SCHOFER, *Primary Examiner.*

S. M. LEVIN, W. HOOVER, *Assistant Examiners.*